(12) United States Patent
Baumann et al.

(10) Patent No.: US 11,901,537 B2
(45) Date of Patent: Feb. 13, 2024

(54) SYSTEMS AND METHODS FOR PURGING AIR FROM BATTERY COOLING SYSTEMS

(71) Applicant: Caterpillar Inc., Peoria, IL (US)

(72) Inventors: Jonathan M. Baumann, Hanna City, IL (US); Jared Lamkin, Ladd, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/558,306

(22) Filed: Dec. 21, 2021

(65) Prior Publication Data

US 2023/0198050 A1  Jun. 22, 2023

(51) Int. Cl.
*H01M 10/6568* (2014.01)
*H01M 10/613* (2014.01)
*H01M 10/625* (2014.01)

(52) U.S. Cl.
CPC ..... *H01M 10/6568* (2015.04); *H01M 10/613* (2015.04); *H01M 10/625* (2015.04); *H01M 2220/20* (2013.01)

(58) Field of Classification Search
CPC ........... H01M 10/6568; H01M 10/613; H01M 10/625; H01M 2220/20
USPC ...................................... 165/80.4
See application file for complete search history.

(56) References Cited

U.S. PATENT DOCUMENTS

| 2,976,859 | A | 3/1961 | Bentz et al. | |
| 6,134,899 | A * | 10/2000 | Brown | F25B 45/00 |
| | | | | 62/149 |
| 7,165,412 | B1 * | 1/2007 | Bean, Jr. | H05K 7/20809 |
| | | | | 62/332 |
| 7,748,262 | B2 | 7/2010 | Reginaldo et al. | |
| 8,439,003 | B2 * | 5/2013 | Araki | F01P 7/165 |
| | | | | 123/41.1 |
| 9,999,845 | B2 | 6/2018 | Dailey et al. | |
| 10,320,040 | B2 * | 6/2019 | Yan | B60L 3/0046 |
| 10,408,477 | B2 * | 9/2019 | Shimamoto | F24F 11/85 |
| 10,727,553 | B1 * | 7/2020 | Gao | H05K 7/20172 |
| 2012/0045681 | A1 * | 2/2012 | Klaus | H01M 10/625 |
| | | | | 429/120 |
| 2012/0145280 | A1 | 6/2012 | Kim et al. | |
| 2012/0261107 | A1 * | 10/2012 | Prinz | H01M 10/6556 |
| | | | | 165/185 |
| 2013/0205818 | A1 * | 8/2013 | Morimoto | F24F 3/06 |
| | | | | 62/333 |

(Continued)

FOREIGN PATENT DOCUMENTS

JP       4656053 B2    3/2011
JP    2014086156 A    5/2014

(Continued)

OTHER PUBLICATIONS

Written Opinion and International Search Report for Int'l. Patent Appln. No. PCT/US2022/080969, dated Apr. 21, 2023 (11 pgs).

*Primary Examiner* — Len Tran
*Assistant Examiner* — Gustavo A Hincapie Serna
(74) *Attorney, Agent, or Firm* — Perkins Coie LLP

(57) ABSTRACT

A method for purging air from a cooling system including operating one or more pumps at a selected speed for a first time interval, waiting a second time interval with the one or more pumps off or at a reduced speed relative to the selected speed, and repeating the steps of operating and waiting multiple times.

13 Claims, 5 Drawing Sheets

(56) References Cited

U.S. PATENT DOCUMENTS

| | | | | |
|---|---|---|---|---|
| 2013/0269379 A1* | 10/2013 | Ue | ............................ | F24F 1/32 |
| | | | | 62/160 |
| 2014/0130888 A1* | 5/2014 | Kaiser | ..................... | B08B 9/032 |
| | | | | 137/246.22 |
| 2015/0001021 A1* | 1/2015 | Matsumoto | ............... | B60L 1/00 |
| | | | | 191/4 |
| 2015/0047379 A1* | 2/2015 | Honda | .................... | F25B 49/02 |
| | | | | 62/177 |
| 2016/0303493 A1* | 10/2016 | Dailey | ............... | B01D 19/0042 |
| 2017/0040653 A1 | 2/2017 | Morris et al. | | |
| 2017/0307269 A1* | 10/2017 | Gu | ........................ | F25B 43/003 |
| 2020/0041181 A1* | 2/2020 | Monteith | ................. | F25B 41/39 |
| 2020/0240685 A1* | 7/2020 | Bradshaw | ............. | F25B 43/043 |
| 2020/0355413 A1* | 11/2020 | Monteith | ................ | F25B 40/02 |
| 2020/0391601 A1* | 12/2020 | Maeshiro | ................ | B60L 53/16 |
| 2021/0408635 A1* | 12/2021 | Byun | .................. | H01M 50/105 |
| 2022/0320548 A1* | 10/2022 | Miyazaki | ........... | H01M 8/04014 |
| 2022/0393262 A1* | 12/2022 | Rosenberger | ....... | H01M 10/615 |
| 2023/0138661 A1* | 5/2023 | Mohlin | .................. | B01D 5/006 |
| | | | | 123/41.01 |

FOREIGN PATENT DOCUMENTS

| | | | |
|---|---|---|---|
| KR | 101575431 B1 | 12/2015 | |
| KR | 101765589 B1 | 8/2017 | |

* cited by examiner

SYSTEMS AND METHODS FOR PURGING AIR FROM BATTERY COOLING SYSTEMS

TECHNICAL FIELD

This patent application is directed to battery cooling systems, and more specifically, to methods for purging air from battery cooling systems.

BACKGROUND

Battery electric machines require cooling in order to operate in mining and construction applications. Battery cooling systems can include pumps, chiller/heat exchangers, battery cooling mechanisms, tubing, a tank, a shunt tank, and coolant as a media. While filling a cooling system after initial build or major service, air can remain in the system and be trapped where it is difficult to detect and/or remove. It is important that the air be removed from the system to allow the coolant to properly remove heat from all the battery cells throughout a battery module. Depending on the orientation and packaging of the battery modules, it is possible for air to become trapped causing insufficient cooling of a cell or module. Purging air from a complex cooling system can be difficult.

Efforts have been made to develop methods for removing air from cooling systems. For example, Japanese Patent No. JP4656053 to Masakatsu (hereinafter "Masakatsu") describes removing air from a cooling system that is trapped around the impeller of a pump. A key switch is provided in the operators cab to operate the pump at defined intervals to eliminate the air introduced to the system during maintenance of the cooling system. Masakatsu is directed to situations when air is surrounding the pump impeller preventing it from moving coolant. However, Masakatsu does not address situations where air is trapped in coolant passages even though coolant is flowing through the passages.

Thus, there is still a need for methods and systems to effectively purge air from battery cooling systems, for example. The example systems and methods described herein are directed to overcoming one or more of the deficiencies described above and/or other problems with the prior art.

SUMMARY

In some embodiments, a method for purging air from a cooling system includes operating one or more pumps at a selected speed for a first time interval, waiting a second time interval with the one or more pumps off or at a reduced speed relative to the selected speed, and repeating the steps of operating and waiting multiple times.

In some aspects of the disclosed technology the selected speed is in a range of 3000 to 5000 RPM. In other aspects, the reduced speed is in a range of 1 to 1000 RPM. In some aspects, the selected speed is in a range of 75 percent to 125 percent of maximum pump speed. In some aspects, the reduced speed is in a range of 0 percent to 25 percent of maximum pump speed. In further aspects, the first time interval is in a range of 8 to 12 seconds. In some aspects, the second time interval is in a range of 4 to 8 seconds. In further aspects, the first time interval is in a range of 16 to 24 seconds and the second time interval is in a range of 8 to 16 seconds. In some aspects, the method can further comprise receiving a first signal to initiate purging the air from the system and receiving a second signal to return the one or more pumps to normal operation. In further aspects, the steps of operating and waiting are repeated at least five times.

In some embodiments, a battery cooling system can include one or more flexible bladders each configured to contact a set of batteries. The flexible bladders can comprise a serpentine fluid pathway. The system can also include one or more pumps in fluid communication with the one or more flexible bladders, one or more processors, and one or more memory devices having instructions stored thereon. The instructions can cause the one or more processors to initiate purging air from the serpentine fluid pathway of the one or more flexible bladders upon receiving a first signal. The instructions can cause the processors to operate the one or more pumps at a selected speed for a first time interval and wait a second time interval with the one or more pumps off or at a reduced speed relative to the selected speed. The steps of operating and waiting are repeated multiple times. In some aspects of the disclosed technology, the system can further comprise a button operative to provide the first signal and the second signal.

In some embodiments, a battery cooling system can include one or more flexible bladders each configured to contact a set of batteries. The flexible bladders can comprise a serpentine fluid pathway. The system can also include one or more pumps in fluid communication with the one or more flexible bladders, one or more processors, and one or more memory devices having instructions stored thereon. The instructions can cause the one or more processors to initiate purging air from the serpentine fluid pathway of the one or more flexible bladders upon receiving a first signal. The instructions can cause the processors to operate the one or more pumps at a selected speed for a first time interval and wait a second time interval with the one or more pumps off or at a reduced speed relative to the selected speed. The steps of operating and waiting can be repeated at least five times. The instructions can cause the processors to return the one or more pumps to normal operation upon receiving a second signal.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
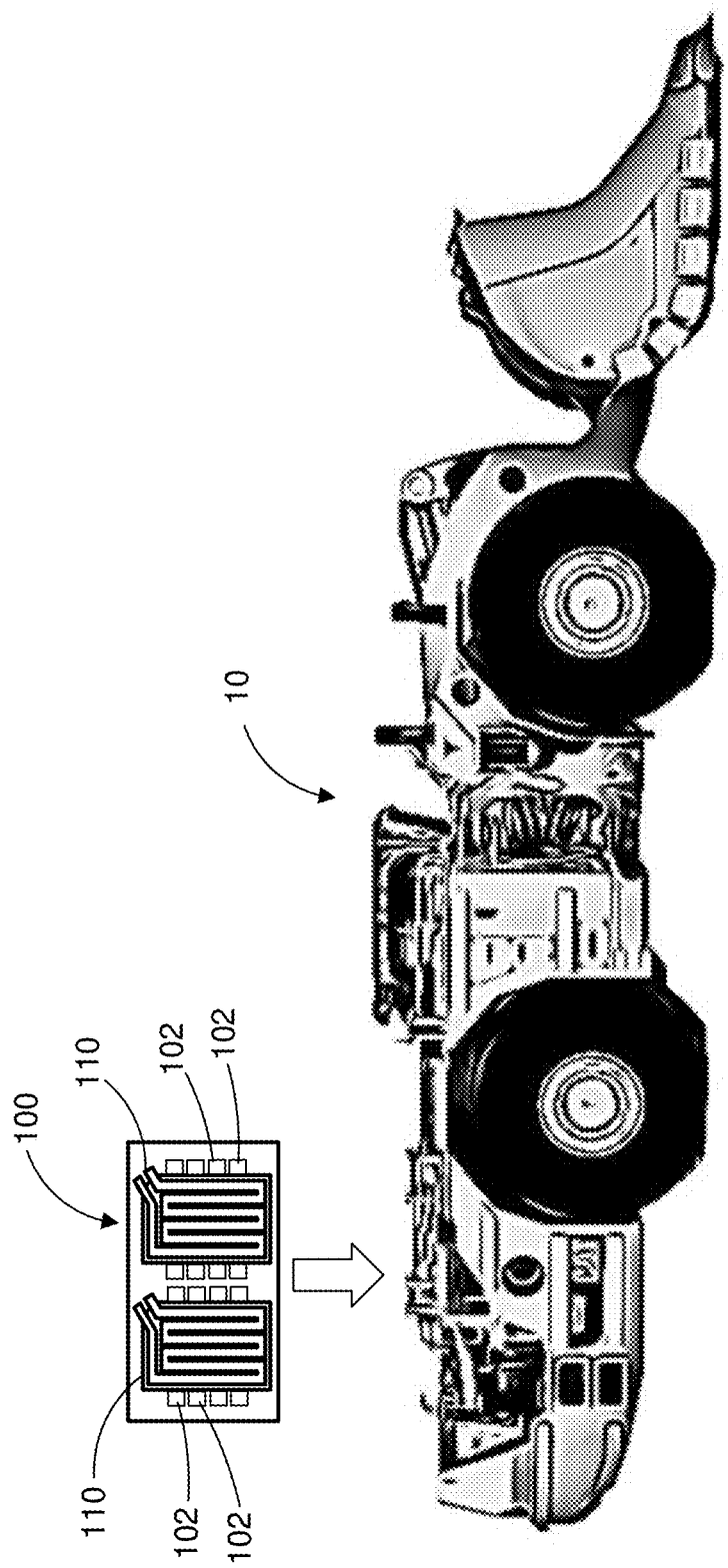
FIG. 1 is a diagram illustrating a battery electric underground mining loader with a battery cooling system according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

When a battery cooling system is filled after initial build or major service, air can remain in the system and be trapped where it is difficult to detect and/or remove. It is important that the air be removed from the system to allow the coolant to properly remove heat from all the battery cells throughout a battery module. There are a few ways to purge air from a cooling system. One is to increase fluid velocity to the point where entrapped air is carried out of the system into a shunt tank. However, if air is trapped in a 'dead' zone, then fluid velocity, by itself, may not be enough and the air and resulting poor cooling will persist. Another way to purge air is through bouncing a mobile machine around during application and, over time, the air dislodges from its area of entrapment, gets into the fluid stream, and is carried out with the fluid. This method can take time and the machine can be in operation for some time with poor cooling before all the air is purged. Furthermore, some machines are stationary and do not 'bounce' around.

The disclosed systems and methods exercise the fluid and the air in the cooling system in order to disturb the air. This disturbance forces trapped air out of its entrapment and into the moving fluid in order to be carried out of the system and into a shunt tank, for example. This dynamic manipulation of the air helps prevent any air pockets from staying trapped and creates the opportunity for the fluid to 'grab' the air and carry it out of the system. This control method uses a pattern of high and low fluid velocity pulses that disturb the air and move it into a place where the fluid can carry it away. The pulse or air purge feature can be activated in the cab of the machine by a technician by a press of a button and used any time the cooling system has been disturbed (e.g., during major service) and creates an air purge process that allows a technician to properly top off the coolant level before the machine leaves the shop and is put into service.

FIG. 1 is a diagram illustrating a battery electric underground mining loader with one or more battery modules 100, each having a battery cooling system according to embodiments of the disclosed technology. In some embodiments, the battery module 100 can include multiple battery cells 102 and associated flexible cooling bladders 110, each configured to contact a set of the batteries 102.

Figure 2:
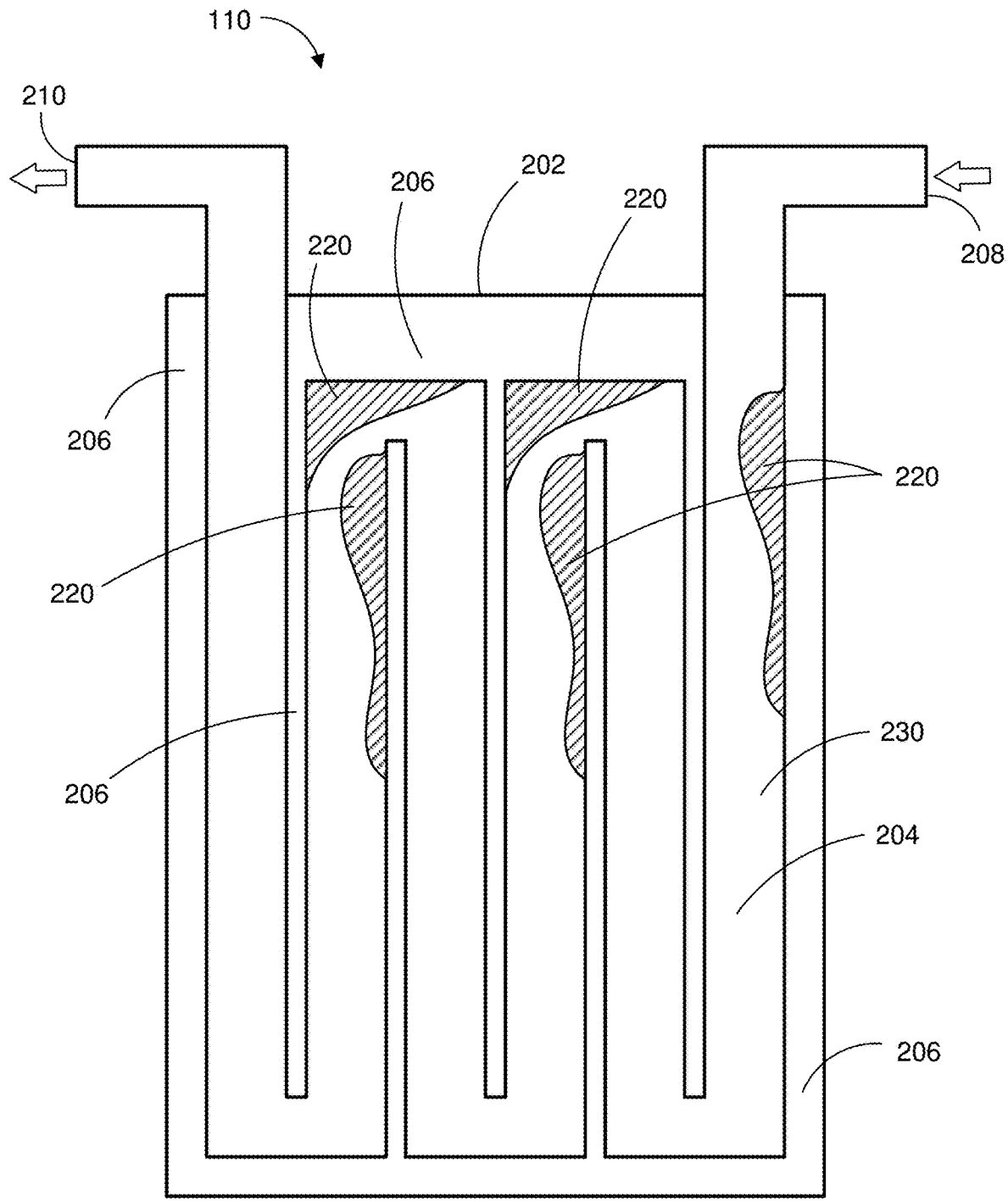
FIG. 2 is a diagram illustrating a battery cooling bladder according to embodiments of the disclosed technology.

With reference to FIG. 2, the flexible bladders 110 can comprise sheets of plastic material 202 welded together to form a serpentine fluid pathway 204 defined by welded region 206. The fluid pathway 204 has an inlet 208 and an outlet 210. The cooling bladders 110 are generally flat, flexible bladders that can conform to the surface (e.g., curvature) of the batteries to enhance cooling. However, air pockets 220 can become trapped along the serpentine fluid pathway 204. The disclosed technology disturbs these air pockets 220 and forces the air into the moving fluid 230 in order to be carried out of the system. Although embodiments disclosed herein are described in terms of a system comprising flexible cooling bladders, the disclosed air purge technology is applicable to other fluidic systems and components where air can become trapped. In some embodiments, the cooling bladders can have a rigid construction. For example, the fluid pathway can be defined by insulated metal. The disclosed technology is also applicable to conventional engine cooling systems comprising e.g., radiators, hoses, pumps (e.g., electric), and engine coolant passages and jackets.

Figure 3:
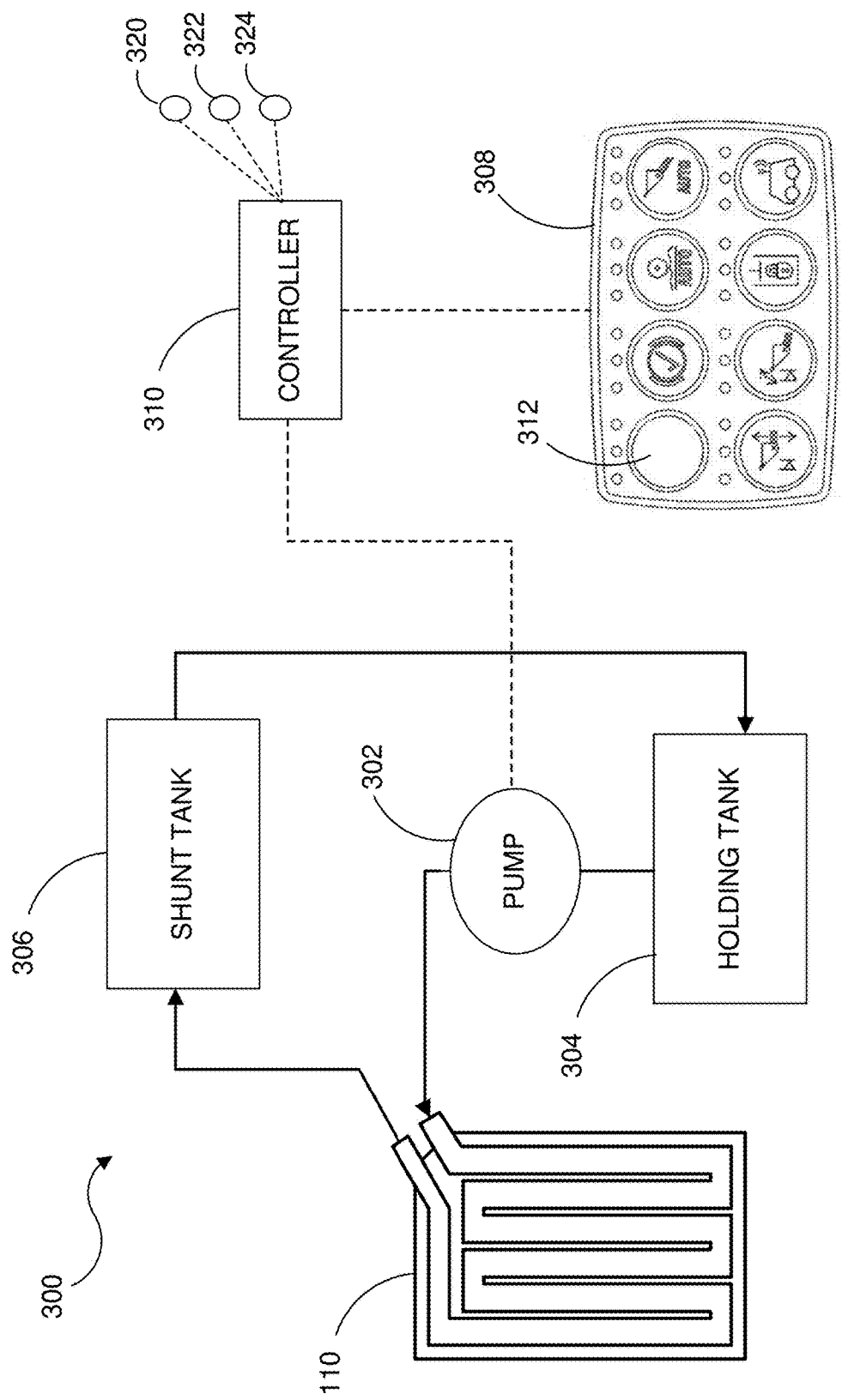
FIG. 3 is a schematic diagram of a battery cooling system according to embodiments of the disclosed technology.

FIG. 3 is a schematic diagram of a battery cooling system 300 according to embodiments of the disclosed technology. The cooling system 300 can include one or more cooling bladders 110, one or more pumps 302, a holding tank 304, a shunt tank 306 and a controller 310. The pump 302 circulates coolant from the holding tank 304 through the cooling bladder 110 and into the shunt tank 306. The controller 310 dynamically operates the pump 302 to disturb any air 220 (FIG. 2) trapped in the cooling bladder 110 so that it can be carried out of the system and into a shunt tank 306, for example. The controller 310 uses a pattern of high and low fluid velocity pulses that disturb the air and move it into a place where the fluid can carry it away. The pulse or air purge feature can be activated in the cab of the machine by a technician by a press of a button, such as button 312, on control panel 308. In some embodiments the button can be a spare button on the control panel 308.

In some embodiments, the first push of the button 312 illuminates a first LED 320 and commands to the coolant pumps 302 to run at 3000 RPM. A second push of button 312 Illuminates the first LED 320 and a second LED 322, and commands the coolant pumps 302 to run at 4000 RPM. The ability to run the pumps at a constant e.g., 3000 rpm or 4000 rpm can aid filling and topping off the system after major service. A third push of button 312 (e.g., a begin signal) will illuminate three LEDs (320, 322, and 324) and initiate an automatic air purge routine. During the air purge routine the controller 310 commands the pumps 302 to run at 4000 RPM for 10 seconds and then 0 rpm for 6 seconds. In some embodiments, the pumps 302 can run at 100 percent flow capacity or pump speed for 10 seconds and then 0 percent for 6 seconds. This pattern is repeated multiple times e.g., ten times. A fourth push of button 312 (e.g., an end signal) turns off all LEDs (320, 322, and 324) and returns the pumps 302 to normal operation, thereby ending the purge routine.

Figure 4:
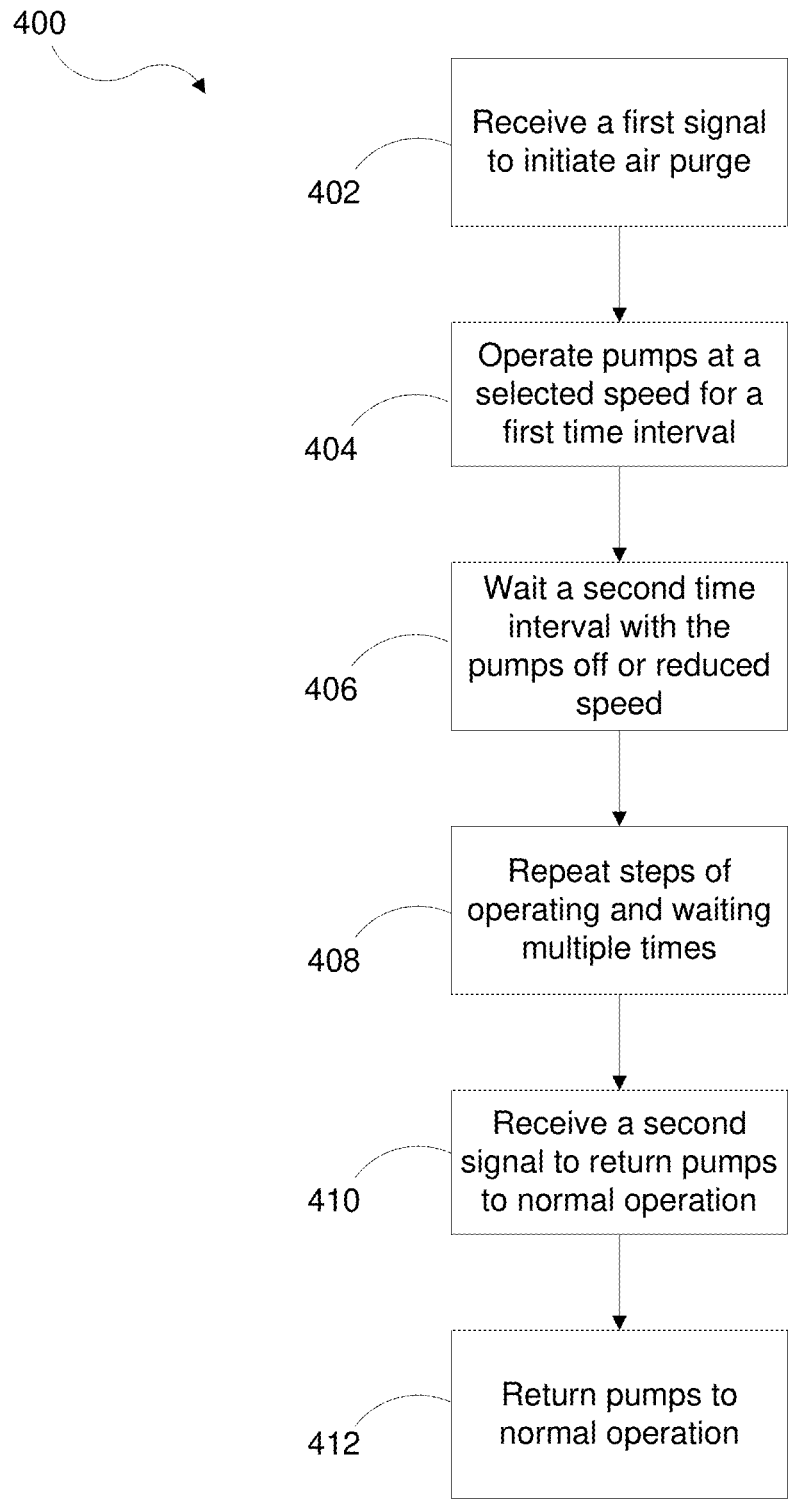
FIG. 4 is a flow diagram illustrating a method for purging air from a cooling system according to embodiments of the disclosed technology.

FIG. 4 is a flow diagram illustrating a method 400 for purging air from a cooling system according to embodiments of the disclosed technology. The method 400 can include receiving a first signal (e.g., a begin signal), at step 402, to initiate purging the air from the system. At step 404, the method can include operating one or more pumps at a selected speed for a first time interval. At step 406, the method includes waiting a second time interval with the one or more pumps off or at a reduced speed relative to the selected speed. The steps of operating and waiting are repeated multiple times at step 408. At step 410 the method can include receiving a second signal (e.g., an end signal) to return the one or more pumps to normal operation. The pumps are then returned to normal operation at step 412.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs, DVDs, Blu-Ray disks), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 5:
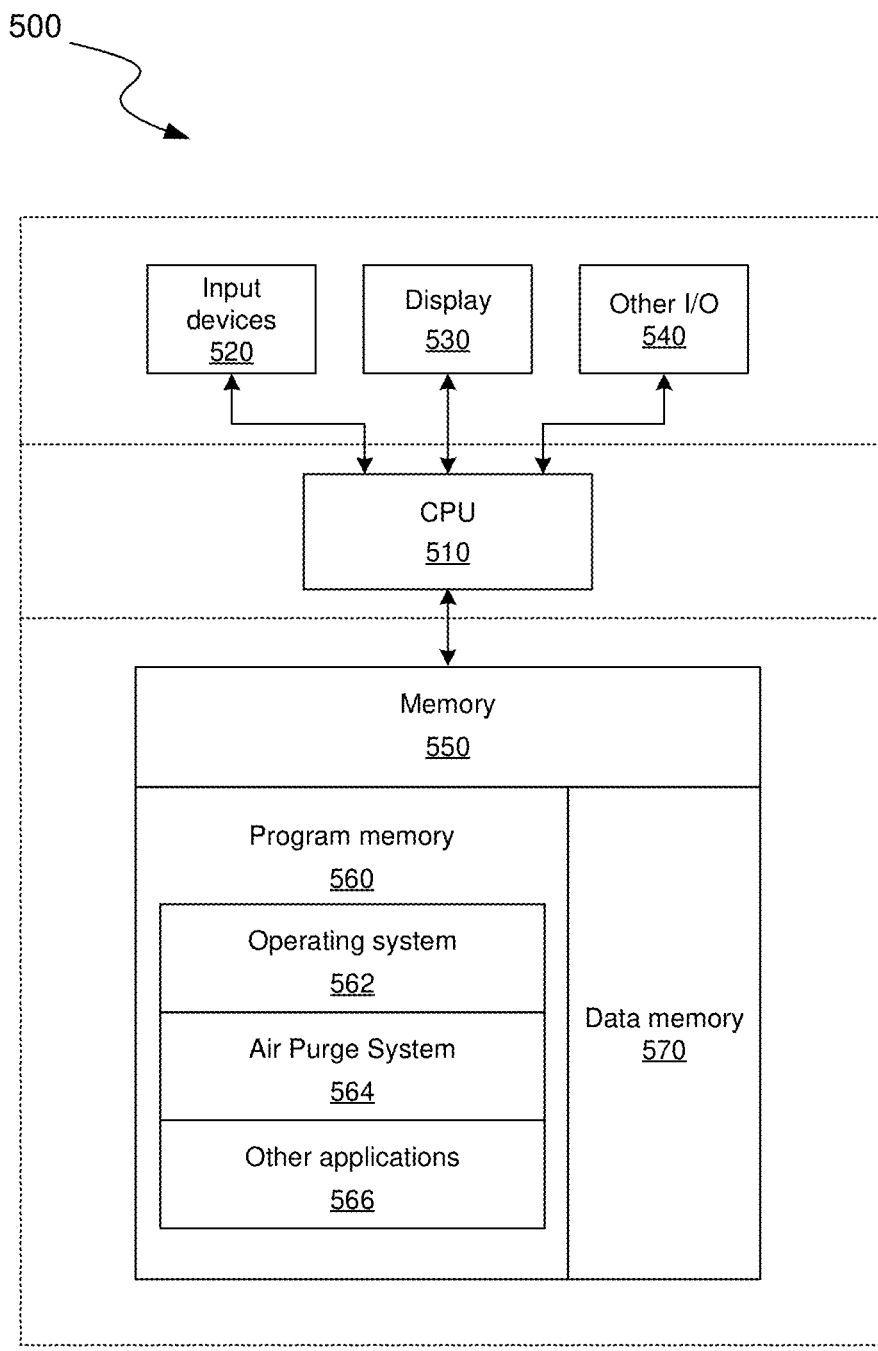
FIG. 5 is a block diagram illustrating an overview of devices on which some implementations can operate.

Several implementations are discussed below in more detail in reference to the figures. FIG. 5 is a block diagram illustrating an overview of devices on which some implementations of the disclosed technology can operate. The devices can comprise hardware components of a device 500. Device 500 can include one or more input devices 520 that provide inputs to the CPU (processor) 510, notifying it of actions. The actions are typically mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device, a microphone, buttons, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as for a display 530. Display 530 can be used to display text and graphics. In some examples, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 540 can also be coupled to the processor, such as a network card, video card, audio card, audible and/or visual alarms, USB, FireWire or other external device, sensor, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The CPU 510 can have access to a memory 550. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, Blu-Ray disks, magnetic storage devices, tape drives, device buffers, and so forth. A memory is not a propagating signal divorced from underlying hardware; a memory is thus non-transitory. Memory 550 can include program memory 560 that stores programs and software, such as an operating system 562, Air Purge System 564, and other application programs 566. Memory 550 can also include data memory 570 that can include database information, etc., which can be provided to the program memory 560 or any element of the device 500.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Those skilled in the art will appreciate that the components illustrated in FIG. described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a battery cooling system can include one or more cooling bladders 110, one or more pumps 302, a holding tank 304, a shunt tank 306, and a controller 310. The controller 310 can include one or more processors 510 and one or more memory devices 550 having an air purge system 564 stored thereon. In operation, the pump 302 circulates coolant from the holding tank 304 through the cooling bladder 110 and into the shunt tank 306. In operation, the air purge system 564 can initiate purging air from a serpentine fluid pathway of the one or more cooling bladders 110 upon receiving a first signal from a control panel 308, e.g., button 312. The air purge system 564 can operate the one or more pumps 302 at a selected speed for a first time interval; wait a second time interval with the one or more pumps 302 off or at a reduced speed relative to the selected speed; and repeat the steps of operating and waiting multiple times. In some embodiments, the controller 310 can also provide manual control of the pumps 302 via the button 312.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A battery cooling system, comprising:
   one or more flexible bladders each configured to contact a set of batteries, wherein the flexible bladders comprise a serpentine fluid pathway;
   one or more pumps in fluid communication with the one or more flexible bladders;
   one or more processors; and
   one or more memory devices having stored thereon instructions that when executed by the one or more processors cause the one or more processors to:
      while the one or more pumps operate at a first constant speed, receive a first signal;
      in response to receiving the first signal, perform operations including:
         operate the one or more pumps at a second selected speed for a first time interval;
         wait a second time interval with the one or more pumps off or at a third reduced speed relative to the second selected speed; and
         repeat the steps of operating and waiting for a predetermined number of times;
      receive a second signal; and
      in response to receiving the second signal, perform operations including:
         operate the one or more pumps at the first constant speed.

2. The system of claim 1, wherein the first constant speed corresponds to normal operation.

3. The system of claim 2, further comprising a button operative to provide the first signal and the second signal.

4. The system of claim 1, wherein the second selected speed exceeds 75 percent of maximum pump speed.

5. The system of claim 1, wherein the third reduced speed is in a range of 0 percent to 25 percent of maximum pump speed.

6. The system of claim 1, wherein the first time interval is in a range of 8 to 12 seconds.

7. The system of claim 1, wherein the second time interval is in a range of 4 to 8 seconds.

8. The system of claim 1, wherein the steps of operating and waiting are repeated at least five times.

9. A battery cooling system, comprising:
   one or more flexible bladders each configured to contact a set of batteries, wherein the flexible bladders comprise a serpentine fluid pathway;
   one or more pumps in fluid communication with the one or more flexible bladders;
   one or more processors; and
   one or more memory devices having stored thereon instructions that when executed by the one or more processors cause the one or more processors to:
      while the one or more pumps operate at a first constant speed, receive a first signal;
      in response to receiving the first signal, perform operations including:
         operate the one or more pumps at a second selected speed for a first time interval;
         operate the one or more pumps for a second time interval with the one or more pumps at a third reduced speed relative to the second selected speed;
         repeat the steps of alternatively operating at the second selected speed and the third reduced speed for a predetermined number of times, the predetermined number of times being at least five times;
      receive a second signal; and
      upon receiving the second signal, return the one or more pumps to normal operation by operating the one or more pumps at the first constant speed.

10. The system of claim 9, further comprising a button operative to provide the first signal and the second signal.

11. The system of claim 9, wherein the second selected speed exceeds 75 percent of maximum pump speed.

12. The system of claim 9, wherein the third reduced speed is in a range of 0 percent to 25 percent of maximum pump speed.

13. The system of claim 9, wherein the first time interval is in a range of 8 to 12 seconds.

* * * * *